(12) United States Patent
Szuba et al.

(10) Patent No.: US 9,381,557 B2
(45) Date of Patent: Jul. 5, 2016

(54) METHOD OF FORMING INTEGRATED DRIVE SHAFT AND YOKE

(71) Applicants: Szuba Consulting, Inc., Dearborn, MI (US); Value Extraction LLC, Dearborn, MI (US)

(72) Inventors: Joseph Szuba, Dearborn, MI (US); Henry E. Fradkin, Dearborn, MI (US)

(73) Assignees: SZUBA CONSULTING, INC., Dearborn, MI (US); VALUE EXTRACTION LLC, Dearborn, MI (US)

( * ) Notice: Subject to any disclaimer, the term of this patent is extended or adjusted under 35 U.S.C. 154(b) by 0 days.

(21) Appl. No.: 14/384,783

(22) PCT Filed: Mar. 18, 2013

(86) PCT No.: PCT/US2013/032798
§ 371 (c)(1),
(2) Date: Sep. 12, 2014

(87) PCT Pub. No.: WO2013/138806
PCT Pub. Date: Sep. 19, 2013

(65) Prior Publication Data
US 2015/0096344 A1   Apr. 9, 2015

Related U.S. Application Data

(60) Provisional application No. 61/611,977, filed on Mar. 16, 2012.

(51) Int. Cl.
| | |
|---|---|
| *B21C 37/16* | (2006.01) |
| *B21H 1/18* | (2006.01) |
| *B21B 23/00* | (2006.01) |
| *B21D 51/16* | (2006.01) |

(Continued)

(52) U.S. Cl.
CPC .................. *B21C 37/16* (2013.01); *B21B 23/00* (2013.01); *B21D 51/16* (2013.01); *B21H 1/18* (2013.01); *B21K 1/12* (2013.01); *B60K 17/22* (2013.01)

(58) Field of Classification Search
CPC .......... B21C 37/16; B21D 51/16; B21H 1/18; B21K 1/12; B21K 1/06; B21B 23/00; B60K 17/22
See application file for complete search history.

(56) References Cited

U.S. PATENT DOCUMENTS

| | | | | |
|---|---|---|---|---|
| 1,644,800 | A * | 10/1927 | Urschel | ..................... F16D 3/06 |
| | | | | 464/113 |
| 2,227,436 | A * | 1/1941 | Buckwalter | .............. B21K 1/10 |
| | | | | 72/208 |

(Continued)

FOREIGN PATENT DOCUMENTS

| | | |
|---|---|---|
| JP | 07-019234 A | 1/1995 |
| JP | 2012-051068 A | 3/2012 |

OTHER PUBLICATIONS

PCT/US2013/032798 International Search Report dated Aug. 14, 2013, 3 pages.

*Primary Examiner* — Teresa M Ekiert
(74) *Attorney, Agent, or Firm* — Carlson, Gaskey & Olds

(57) ABSTRACT

A method of forming a shaft for transferring force from a driving element to a driven element makes use of a tube. The tube is deformed to define distal ends of said shaft. At least one of the distal ends of the tube is trimmed to define a yoke for engaging one of the driving element or the driven element, with the yoke being integrally formed with the shaft.

14 Claims, 5 Drawing Sheets

(51) Int. Cl.
*B60K 17/22* (2006.01)
*B21K 1/12* (2006.01)

(56) References Cited

U.S. PATENT DOCUMENTS

| | | |
|---|---|---|
| 5,771,737 A | 6/1998 | Yaegashi |
| 5,956,836 A | 9/1999 | Dupuie |
| 6,257,041 B1 * | 7/2001 | Duggan ................ B21K 1/063 29/888.09 |
| 7,181,846 B2 * | 2/2007 | Wagner ................ B21D 26/033 29/419.1 |
| 2002/0013993 A1 | 2/2002 | Menosky et al. |

* cited by examiner

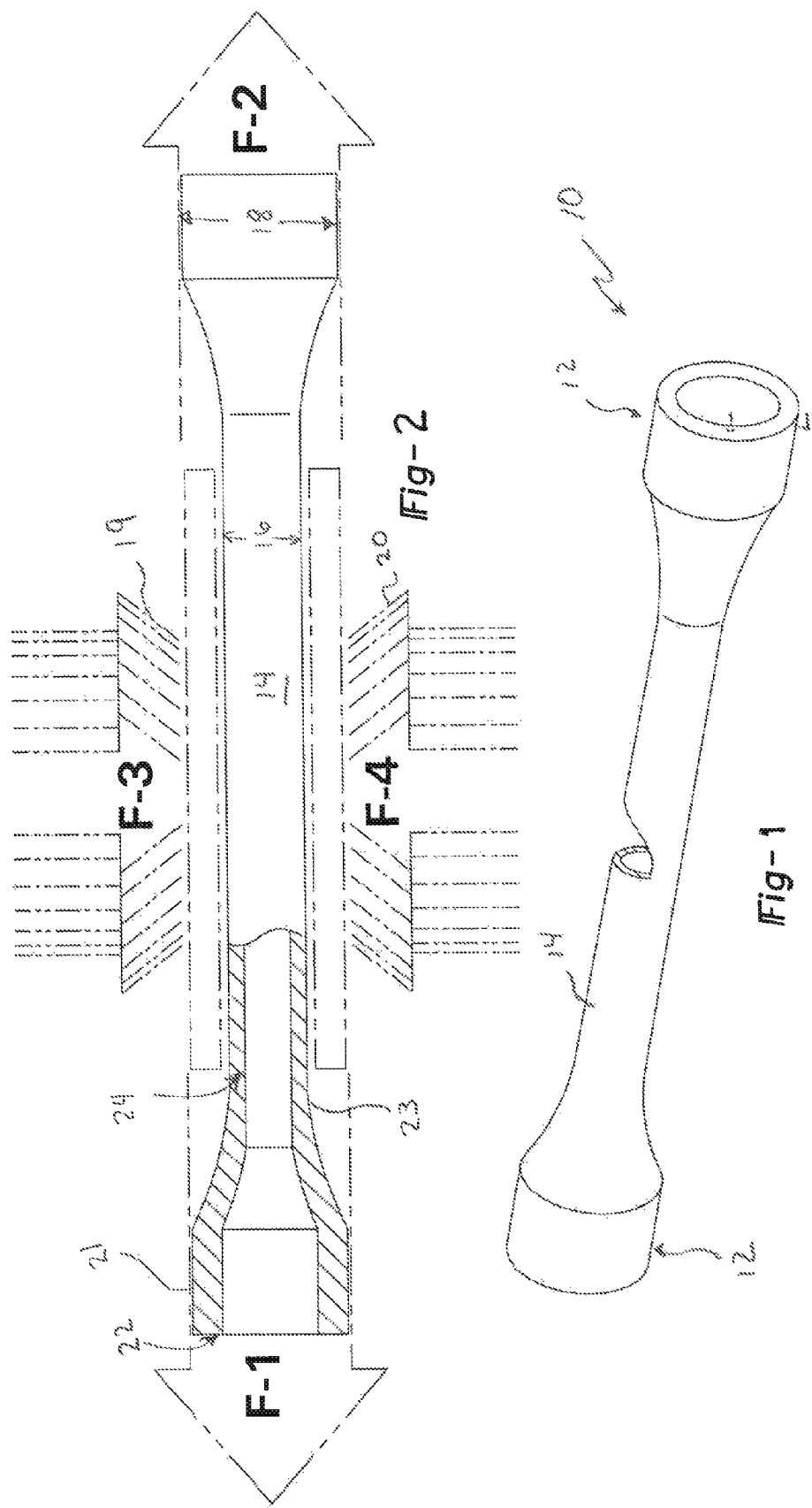

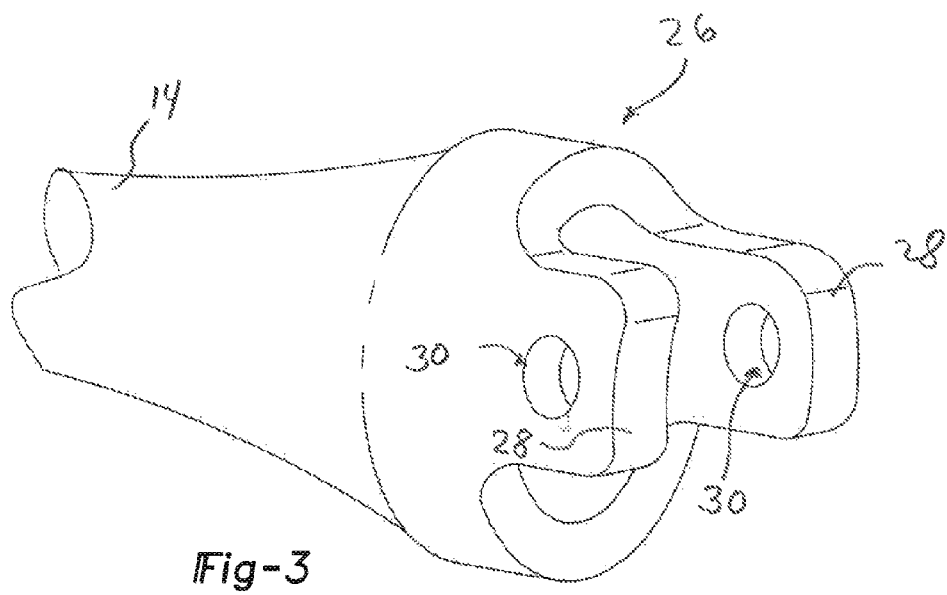
Fig-3
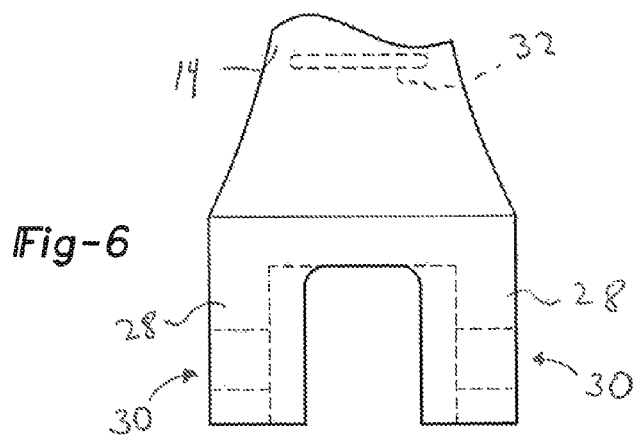
Fig-6
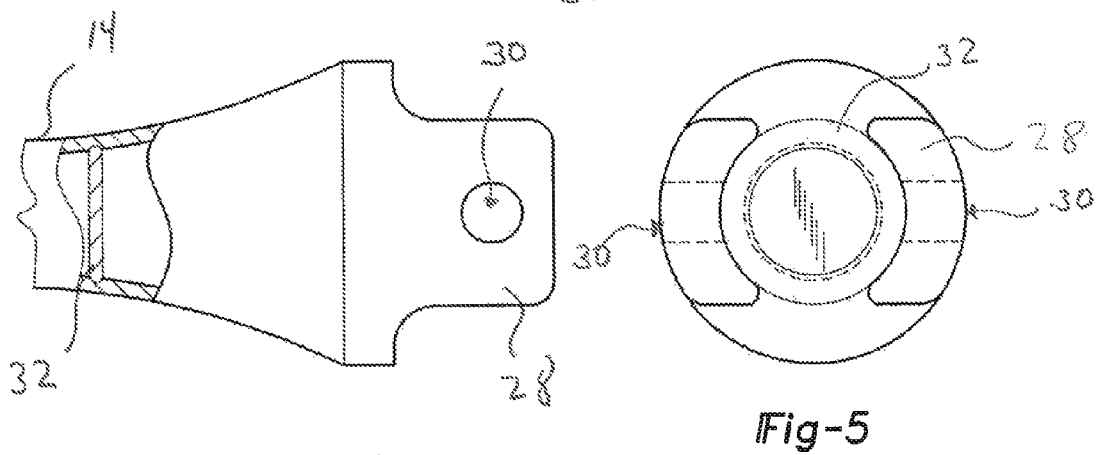
Fig-4
Fig-5

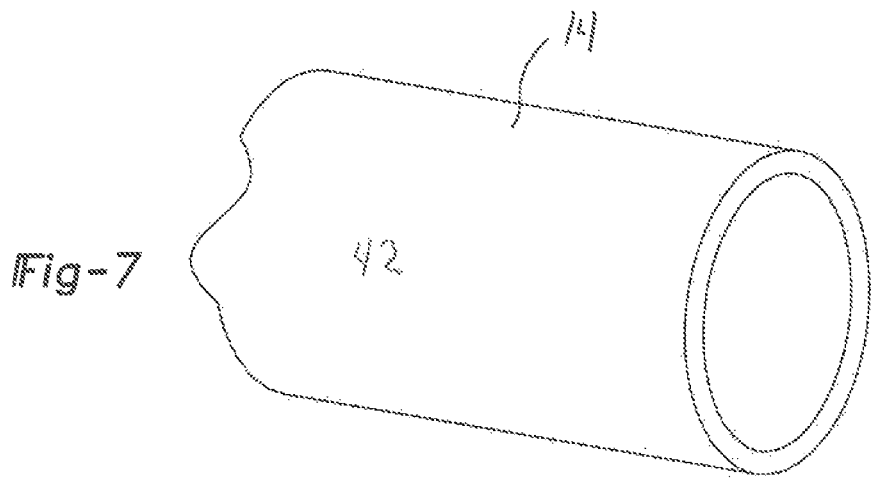
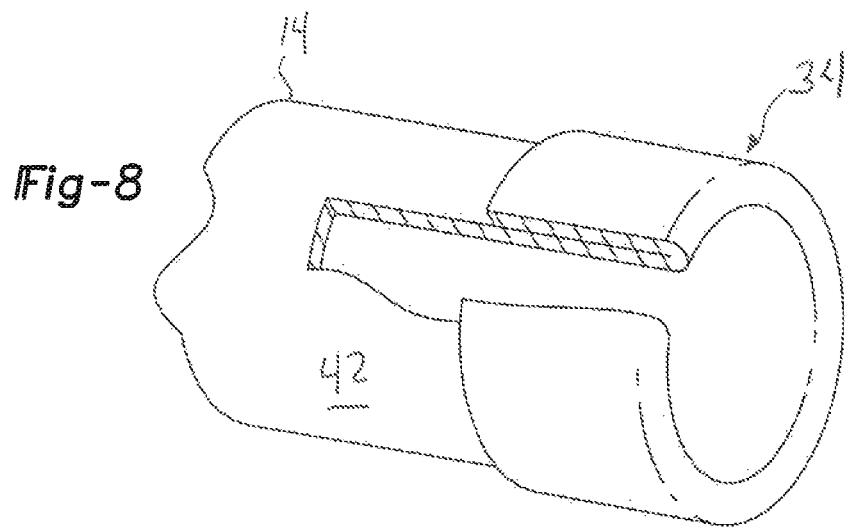
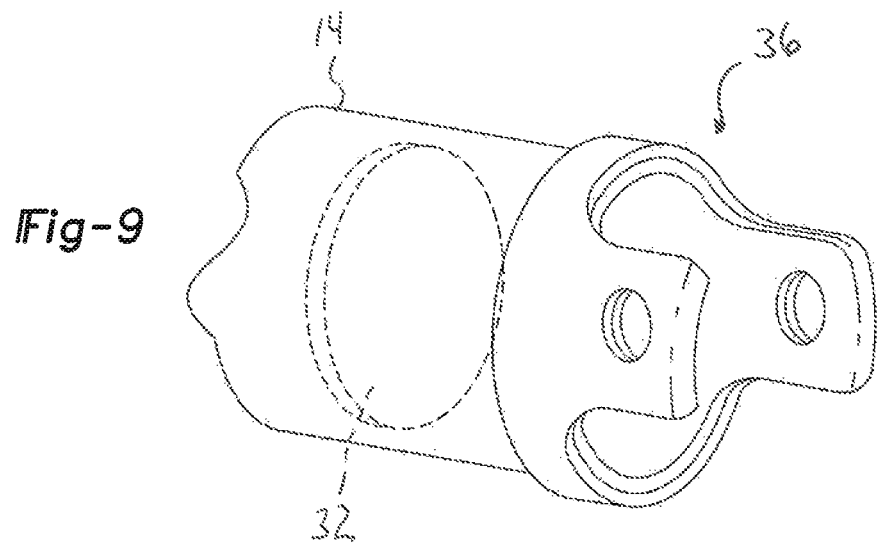

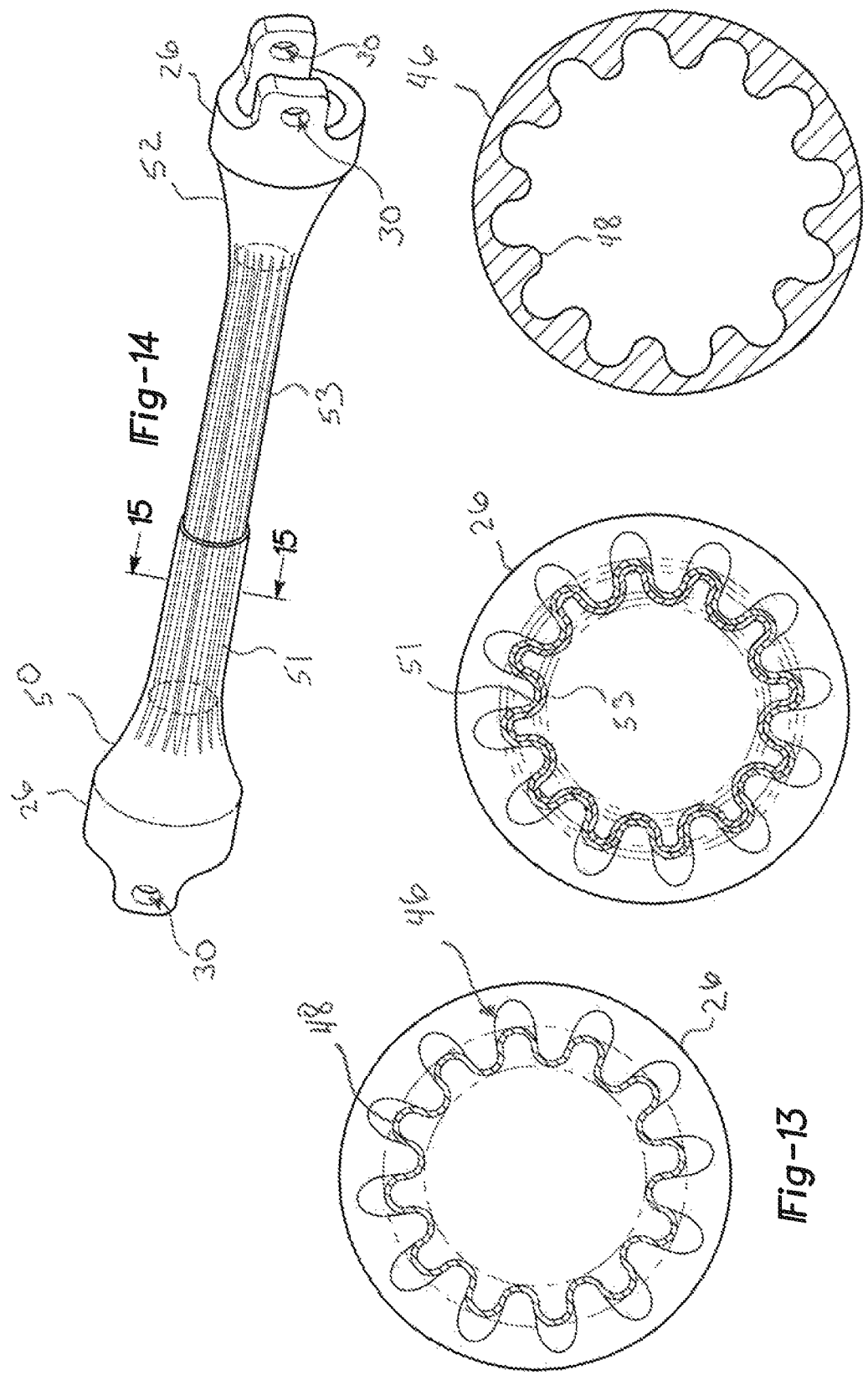

METHOD OF FORMING INTEGRATED DRIVE SHAFT AND YOKE

PRIOR APPLICATIONS

The present application claims priority to U.S. Provisional Patent Application No. 61/611,977 filed Mar. 16, 2012.

FIELD OF THE INVENTION

The present invention relates generally toward a driveshaft for transferring force from a driving element to a driven element. More specifically, the present invention is directed toward an integrated yoke-driveshaft formed from a tube.

BACKGROUND

Shafts have been used for transferring torque from a driving element to a driven element for many years. One example of this type of shaft is a driveshaft of an automotive vehicle that transfers driving force from a motor to wheels for driving the automobile.

These shafts have been formed from tubes and have a yoke or universal joint welded onto a distal ends of the shaft to pivotally engage a drive train or driving element on one end and a differential or a driven element on an opposing end. These yokes are formed from a casting that require a machine or grinding operation to form required apertures for receiving a cruciform or pin to engage the driving element and driven element as explained above.

Once the casting has been machined to its desired configuration, it is welded onto the tube to form the driveshaft. Due to the inherent design and manufacturing flaws associated with a cast yoke, the drive shaft must be balanced to reduce the vibration by affixing weights to various locations of the driveshaft. This process of balancing and welding has proven to be cost prohibitive and inefficient while reducing performance due to the increase in weight resulting from the attempt to balance the shaft.

Therefore, it would be desirable to reduce the necessary operations of affixing a cast yoke to a tube to form a driveshaft, which would improve vehicle performance while reducing manufacturing cost.

SUMMARY

The method of forming a shaft for transferring forces from a driving element to a driven element makes use of a tube. The tube is deformed to define distal ends of the shaft. At least one of the distal ends of the shaft is trimmed to define a yoke for engaging one of the driving element or the driven element. The yoke is integrally formed with the shaft by way of roll forming or cold forming.

Integrally forming a yoke from a tube to compose a driveshaft significantly reduces the cost and mass from present driveshaft designs. Specifically, the elimination of a cast yoke provides a substantial weight reduction. The elimination of a welding process required to affix the cast yoke to a tube additionally reduces manufacturing costs and mass associated with the weld material. Furthermore, by forming a yoke integral with a tube to derive a fully functional driveshaft, the requirement of balancing a welded, cast driveshaft is eliminated.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 1 shows a tube formed into a shaft of the present invention;

FIG. 2 shows a method of forming a tube into the shaft of the present invention;

FIG. 3 shows a perspective view yoke formed onto a distal end of the shaft of the present invention;

FIG. 4 shows a side view of the yoke having a shaft seal;

FIG. 5 shows plan view of the yoke and shaft seal;

FIG. 6 shows a side view of both ears of the yoke;

FIG. 7 shows a distal end of a tube prior to forming a flange;

FIG. 8 shows the distal end of the shaft having a formed flange onto an exterior surface;

FIG. 9 shows a yoke formed into the flange disposed upon the distal end of the shaft;

FIGS. 13 and 16 show end views of the alternative embodiment of the shaft of the present invention;

FIG. 14 shows a perspective view of an alternative embodiment of the present invention having a collapsible shaft; and FIG. 15 shows an end view of the alternative embodiment of the present invention having a collapsible shaft.

DETAILED DESCRIPTION

Figure 10:
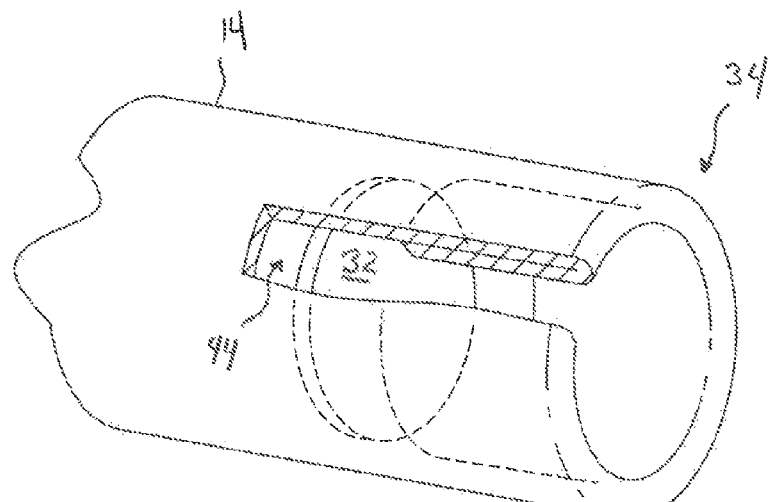
FIG. 10 shows distal end of the shaft having a formed flange onto an interior surface.
Figure 11:
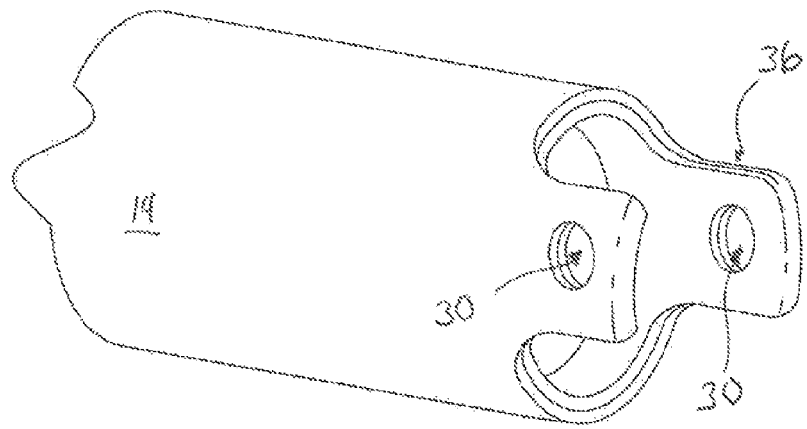
FIG. 11 shows a yoke formed into the flange disposed upon the distal end of the shaft.

A tube is generally shown at 10 of FIG. 1. The tube includes a shaft 14 disposed between opposing distal ends 12.

Referring also to FIG. 2, the shaft 14 defines a shaft diameter 16 and the opposing distal ends 12 define a yoke diameter 18 as will be explained further herein below. The shaft 14 defines the shaft diameter 16 that is narrower than the yoke diameter 18 by way of roll or cold forming elements 19 and 20. The roll forming elements 19, 20 forcibly engage the shaft 14 to reduce the shaft diameter 16 from the yoke diameter 18, which is substantially identical to the original tube diameter (not shown) prior to roll forming the shaft 14.

The roll forming elements 19 and 20 provide force in the direction of F3 and F4 substantially, narrowing the diameter of the tube to achieve a predetermined shaft diameter 16. Two, and possibly three roll forming elements 19, 20 can be used to form the shaft 14 to the predetermined shaft diameter 16. During the forming process, the tube is elongated in a direction of force arrows F1 and F2 as represented in FIG. 2. The elongation of the tube 10 aligns the material grain of the tube 10 in the directions of arrows F1 and F2. Alignment of the material grain provides an increase in tube strength in addition to the cold working increase in material strength. It should be understood by those of ordinary skill in the art that various materials may be used including steel, aluminum, copper, and variations thereof. It is also contemplated by the inventor that certain polymeric materials may also be used to form the integrated drive shaft of the present invention. Furthermore, the shaft 14 may be formed from extrusion dies, and flow forming.

The opposing distal end 12 includes a yoke wall 21 having a yoke wall thickness 22 as will be explained further herein below. The shaft 14 includes a shaft wall 23 having a shaft wall thickness 24 that is less than the yoke wall thickness 22. While roll forming, the shaft wall thickness 22 is decreased from the yoke wall thickness 24, which is substantially the same thickness as the original tube thickness prior to forming.

Referring now to FIG. 3, the distal end 12 of the shaft 14 has been formed into a yoke 27. It should be understood by those of skill in the art that this embodiment includes both opposing distal ends 12 being formed into a yoke 26. One yoke 18 engages in driving element such as, for example, an axial driven transmission element (not shown) and the other yoke 18 engages in a driven element such as, for example, a differential (not shown). Each yoke 27 includes opposing ears 28, each defining an aperture 30. Each aperture 30 receives a pin or cruciform to engage an opposing yoke to establish a universal joint as is known to those of skill in the art. It is further possible to form a cardon joint (not shown).

Therefore, an integrated shaft providing connecting features is established where increased wall thickness is provided at the yoke 26 and where a substantial portion of the forces known to cause failure, in such as, for example, drive shafts of automobiles is known to occur. Furthermore, the reduced wall thickness of the shaft 14, relative to the yoke 26, provides a means for reducing the overall weight of a typical driveshaft of an automotive vehicle by providing wall thickness only where necessary. The integrated shaft 10 of the present invention may also be used for steering columns and other devices where driving elements transfer rotational force to driven elements.

Referring to FIGS. 4, 5, and 6, a seal is provided to prevent contamination from entering the shaft 14 through the yoke 27 in the instance of the integrated shaft 14 being used in an exterior environment. The seal 32 is affixed to the shaft 14 by way of welding, or interference fit, or equivalent.

An alternative embodiment is shown in FIGS. 7 through 11. In this embodiment, it is contemplated that a thinner yoke wall thickness may be used. As best represented in FIG. 8, a flange 34 is formed at the opposing distal ends 12 of the shaft 14. The flange 34 effectively doubles the thickness of the distal ends 12 of the shaft 14. As represented in FIG. 9, the flange distal end 12 is machined or otherwise cut by laser, water jet, or mechanical device to form an alternative yoke 36. Similar to that stated above, alternative ears 38 are formed defining apertures 40 so that the alternative yoke 36 functions as set forth above. While FIG. 8 represents the flange being formed onto an exterior surface 42 of the shaft 14 it should be understood by those skilled in the art that the flange 34 may also be formed into an inner surface 44 of the shaft 14. It should also be understood by those skilled in the art that the seal 32 described above is also included in this alternative embodiment, when necessary.

Figure 12:
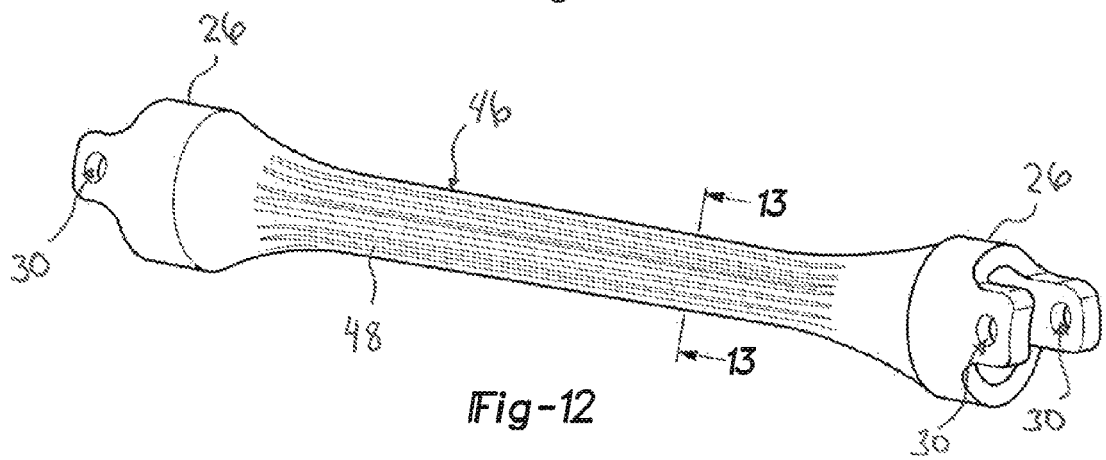
FIG. 12 shows a perspective view an alternative embodiment of the shaft of the present invention.

A still further embodiment is shown in FIGS. 12, 13 and 16. In this embodiment, an alternative shaft 46 is formed having ribs 48 extending lengthwise on the alternative shaft 46 to provide additional strength to the alternative shaft 46. It should be understood to those skilled in the art that the ribs 48 may be formed on an inner surface, outer surface, or both inner and outer surface of the alternative shaft 46. The ribs 48 may be formed by the roll forming elements 19, 20 set forth above, or by way of an alternative or subsequent forming operation.

A still further embodiment is shown in FIGS. 14 and 15. In this embodiment, an integrated shaft 50 includes a yoke 26 on only a single distal end. The integrated shaft 50 is received by a second integrated shaft 52 having a larger diameter so that the shaft provides axial movement to collapse upon impact of the vehicle. As shown in FIG. 15, the alternative shaft ribs 51 engage alternative shaft ribs 53 disposed upon the second integrated shaft 52 for locking engagement providing rotational movement between the first integrated shaft 50 and the second integrated shaft 52.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation while material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims.

What is claimed is:

1. A method of forming a shaft for transferring force from a driving element to a driven element, the method comprising:
    deforming a tube to define distal ends of said shaft, said tube having a wall thickness;
    folding a portion of at least one of said distal ends onto itself to establish a flange, said at least one of said distal ends having an increased thickness that is greater than said wall thickness; and
    trimming said at least one of said distal ends to define a yoke for engaging one of the driving element or the driven element, said yoke comprising a portion of said flange and being integrally formed with said shaft.

2. The method set forth in claim 1, wherein said trimming includes forming opposing ears each having an aperture for receiving a pin for attaching said shaft to one of the driving element or the driven element.

3. The method set forth in claim 1, wherein said deforming includes forming a plurality of shafts from said tube, seriatim.

4. The method set forth in claim 1, wherein said deforming includes reducing a diameter of the tube between said distal ends of said shaft.

5. The method set forth in claim 1, including forming ribs along said shaft between said distal ends of said shaft thereby strengthening said shaft.

6. The method set forth in claim 5, wherein forming said ribs includes forming ribs along an inner wall of said shaft.

7. The method set forth in claim 1, wherein said deforming includes roll forming said tube between said distal ends of the shaft for increasing work hardening and for elongating the grain of the tube for strengthening said shaft.

8. The method set forth in claim 1, wherein said deforming includes decreasing the wall thickness of a section of the tube between said distal ends of said shaft.

9. The method set forth in claim 1, wherein said trimming includes trimming both distal ends of the tube to define opposing yokes of said shaft.

10. The method set forth in claim 1, wherein said trimming includes trimming one distal end of the tube to define a yoke and forming an opposing distal end of the tube for receiving a mating tube for providing a collapsible shaft.

11. The method set forth in claim 1, further including sealing at least one said distal end of said shaft using a seal inside of said shaft.

12. The method set forth in claim 1, wherein said folding includes manipulating a material of said at least one distal end to establish said flange on an outer surface of said at least one distal end.

13. The method set forth in claim 1, wherein said folding includes manipulating a material of said at least one distal end to establish said flange on an inner surface of said at least one distal end.

14. The method set forth in claim 1, wherein said increased thickness is approximately twice said wall thickness.

* * * * *